(12) United States Patent
Shu

(10) Patent No.: US 8,442,396 B2
(45) Date of Patent: May 14, 2013

(54) FOCUS DETECTION APPARATUS

(75) Inventor: Takayuki Shu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/985,808

(22) Filed: Jan. 6, 2011

(65) Prior Publication Data

US 2011/0176793 A1 Jul. 21, 2011

(30) Foreign Application Priority Data

Jan. 15, 2010 (JP) .................................. 2010-007446
Dec. 16, 2010 (JP) .................................. 2010-281015

(51) Int. Cl.
*G03B 3/00* (2006.01)

(52) U.S. Cl.
USPC ........................................................ 396/104

(58) Field of Classification Search .................. 396/104, 396/121
See application file for complete search history.

(56) References Cited

U.S. PATENT DOCUMENTS

| 6,263,164 B1 * | 7/2001 | Nakahara et al. ............. 396/104 |
| 2008/0002958 A1 * | 1/2008 | Inoue et al. ...................... 396/96 |
| 2009/0225210 A1 * | 9/2009 | Sugawa ........................ 348/308 |

FOREIGN PATENT DOCUMENTS

JP 2003-222786 8/2003

* cited by examiner

*Primary Examiner* — Clayton E Laballe
*Assistant Examiner* — Noam Reisner
(74) *Attorney, Agent, or Firm* — Cowan, Liebowitz & Latman, P.C.

(57) ABSTRACT

A focus detection apparatus comprising a focus detection sensor formed by arranging a plurality of pairs of line sensors, each pair of line sensors receiving light beams that have passed through different pupil areas of an imaging lens configured to form an object image, a sensitivity setting unit configured to set a sensitivity for each pair of the plurality of pairs of line sensors, a selection unit configured to select line sensors of the pair of line sensors, whose signals are to be used for focus detection calculation, and a calculation unit configured to perform the focus detection calculation using the signals of the line sensors selected by the selection unit.

18 Claims, 15 Drawing Sheets

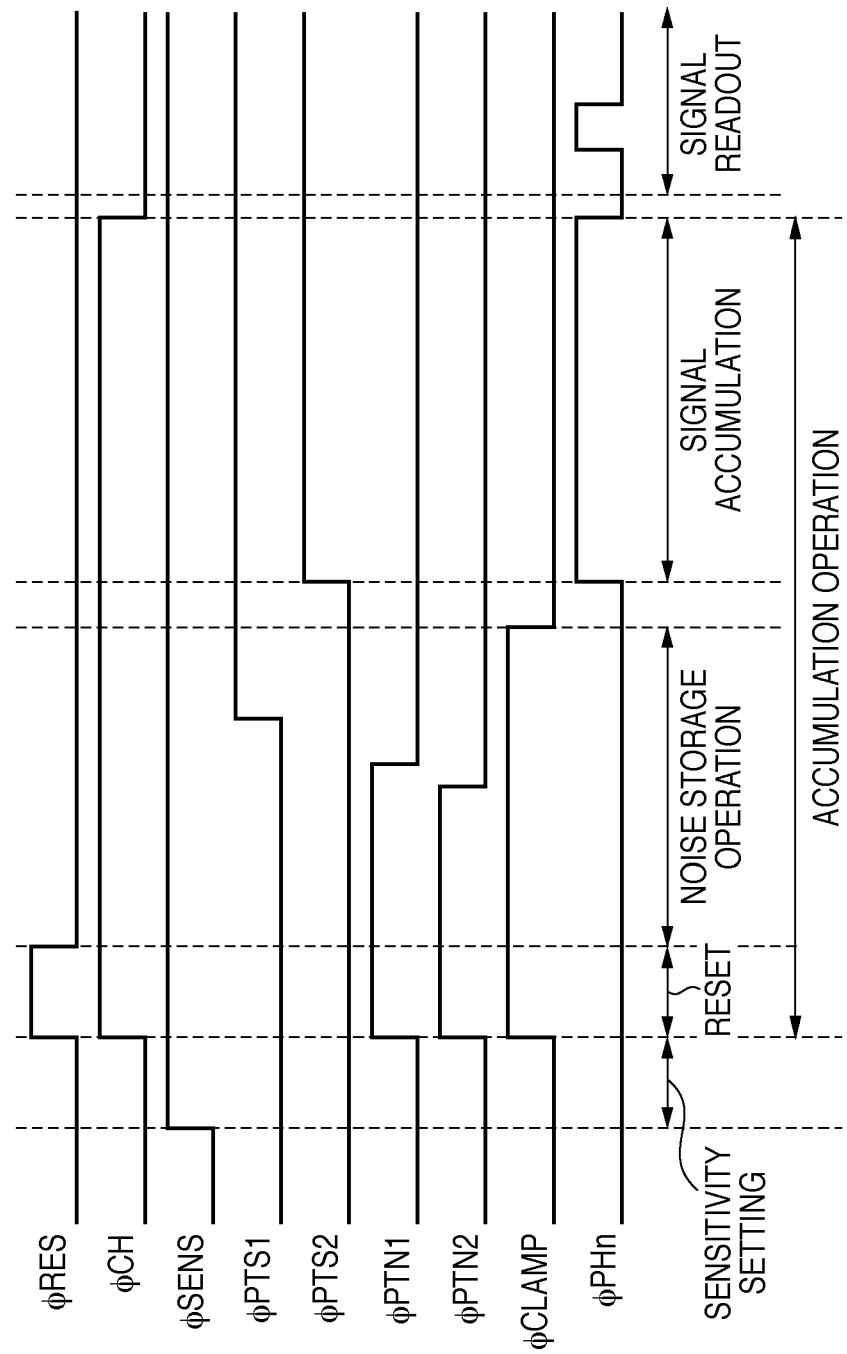

WHEN CONTRAST IS HIGH

WHEN CONTRAST IS LOW

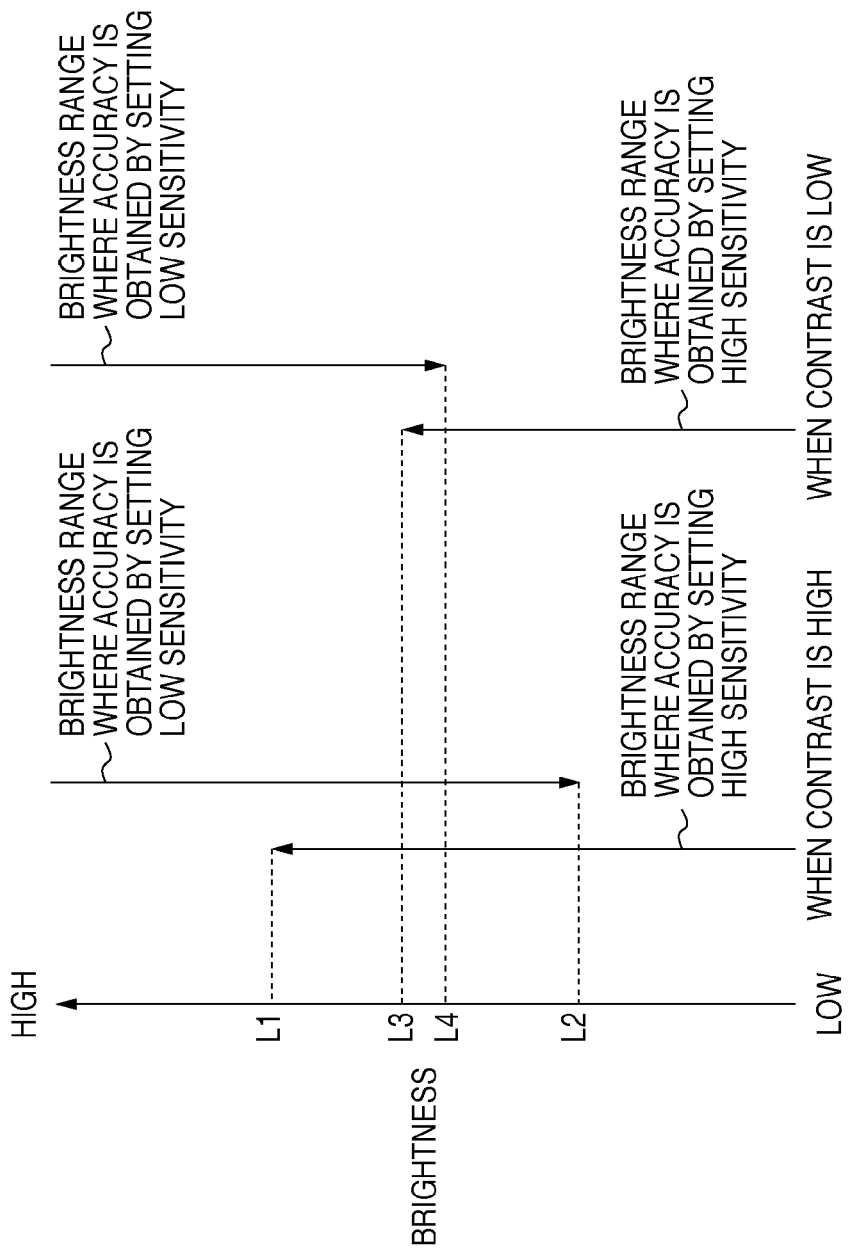

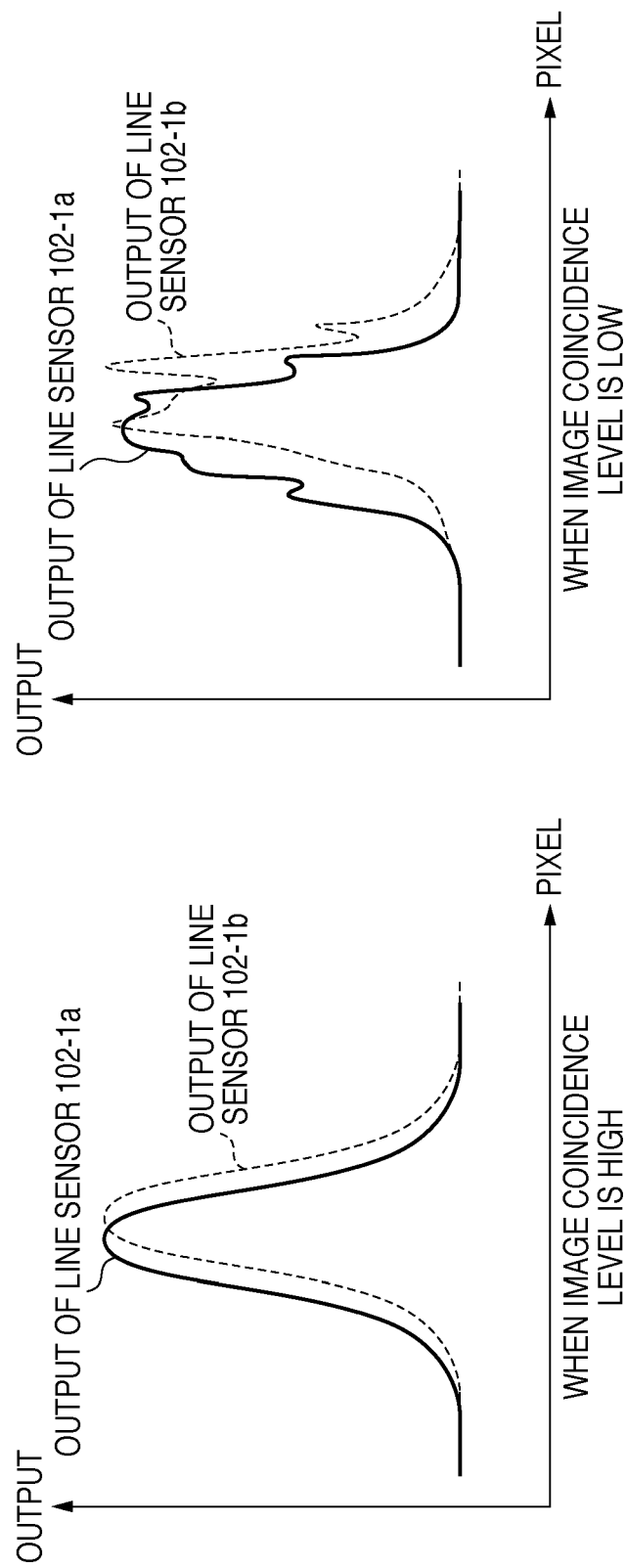

FOCUS DETECTION APPARATUS

BACKGROUND OF THE INVENTION

1. Field of the Invention

The present invention relates to a focus detection technique in an image capturing apparatus such as a digital camera.

2. Description of the Related Art

Conventionally, a phase difference detection method is generally known well as the auto focus detection method of a camera. In the phase difference detection method, light beams from an object, which have passed through different exit pupil areas of an imaging lens, form images on a pair of line sensors of an AF sensor. The relative positions of a pair of object images obtained by causing the pair of line sensors to photoelectrically convert the light are calculated (to be referred to as phase difference calculation hereinafter), thereby detecting the defocus amount of the imaging lens.

For example, Japanese Patent Laid-Open No. 2003-222786 discloses an auto focus solid-state image capturing apparatus of prior art. FIG. 13 is a block diagram showing the auto focus solid-state image capturing apparatus described in Japanese Patent Laid-accumulation time control based on the maximum value signal from an AF circuit 1101. A gain variable signal amplification circuit 1106 performs gain control based on the difference signal between the maximum value signal and the minimum value signal. The signal amplification circuit 1106 outputs a signal based on the minimum value signal. The dynamic range of the sensor is improved by the accumulation time control and gain control.

In the technique disclosed in Japanese Patent Laid-Open No. 2003-222786, however, gain control by the signal amplification circuit is performed at the preceding stage of the output terminal of the auto focus solid-state image capturing apparatus. If the S/N ratio before the signal amplification circuit is poor, it cannot be improved.

When the sensor has a low sensitivity, and the object has a very low brightness, the accumulation time needs to take longer to accurately calculate phase difference. At this time, noise generated by a dark current or in the circuit is nonnegligibly large relative to the accumulation signal so no satisfactory S/N ratio can be obtained. On the other hand, when the sensor has a high sensitivity, and the object has a very high brightness, the sensor is greatly affected by optical shot noise so no satisfactory S/N ratio can be obtained. In the AF sensor circuit, the signal amplification circuit amplifies an accumulation signal including noise. Hence, noise is amplified together, resulting in output with poorer S/N ratio.

SUMMARY OF THE INVENTION

The present invention has been made in consideration of the above-described problem, and allows an AF sensor used in an automatic focus detection apparatus to obtain a satisfactory S/N ratio within a wider brightness range.

According to the present invention, there is provided a focus detection apparatus comprising: a focus detection sensor formed by arranging a plurality of pairs of line sensors, each pair of line sensors receiving light beams that have passed through different pupil areas of an imaging lens configured to form an object image; a sensitivity setting unit configured to set a sensitivity for each pair of the plurality of pairs of line sensors; a selection unit configured to select line sensors of the pair of line sensors, whose signals are to be used for focus detection calculation; and a calculation unit configured to perform the focus detection calculation using the signals of the line sensors selected by the selection unit.

Further features of the present invention will become apparent from the following description of exemplary embodiments with reference to the attached drawings.

BRIEF DESCRIPTION OF THE DRAWINGS

FIGS. 7A to 7C are views showing the pixels of the line sensors according to the first embodiment;

FIG. 10 is a view for explaining reliability determination;

FIGS. 11A and 11B are graphs for explaining the image coincidence level;

DESCRIPTION OF THE EMBODIMENTS

The embodiments of the present invention will now be described in detail with reference to the accompanying drawings.

First Embodiment

Figure 1:
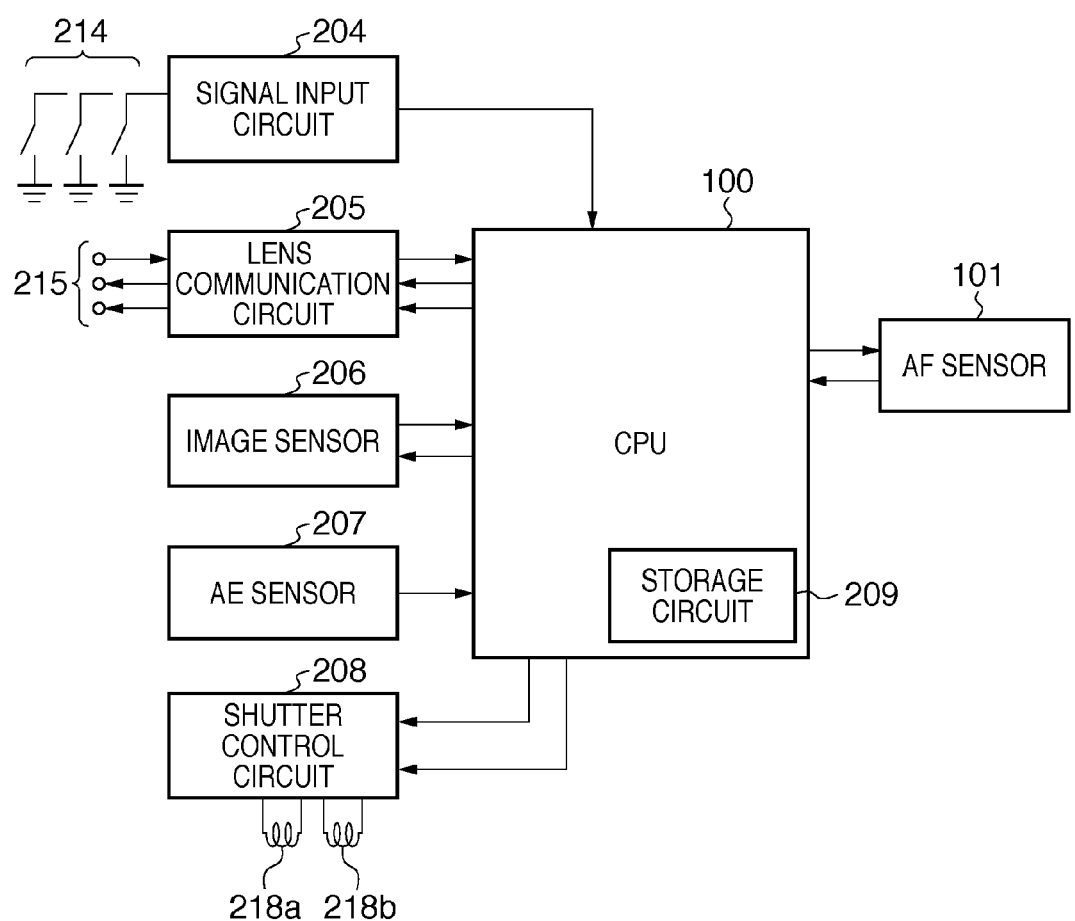
FIG. 1 is a block diagram showing the arrangement of a camera according to the first embodiment of the present invention.

FIG. 1 is a block diagram showing the arrangement of a digital camera serving as an image capturing apparatus according to the first embodiment of the present invention. A signal input circuit 204 that detects a switch group 214 for various operations of the camera, an image sensor (image capturing element) 206, and an AE sensor 207 are connected to a microcomputer (to be referred to as a CPU hereinafter) 100 for the camera. A shutter control circuit 208 that controls shutter magnets 218a and 218b and an AF sensor 101 are also connected. The CPU 100 transmits a signal 215 to an imaging lens 300 (FIG. 2) via a lens communication circuit 205 so as to control the focus position or the stop. The operation of the camera is determined by the settings of the switch group 214.

Figure 2:
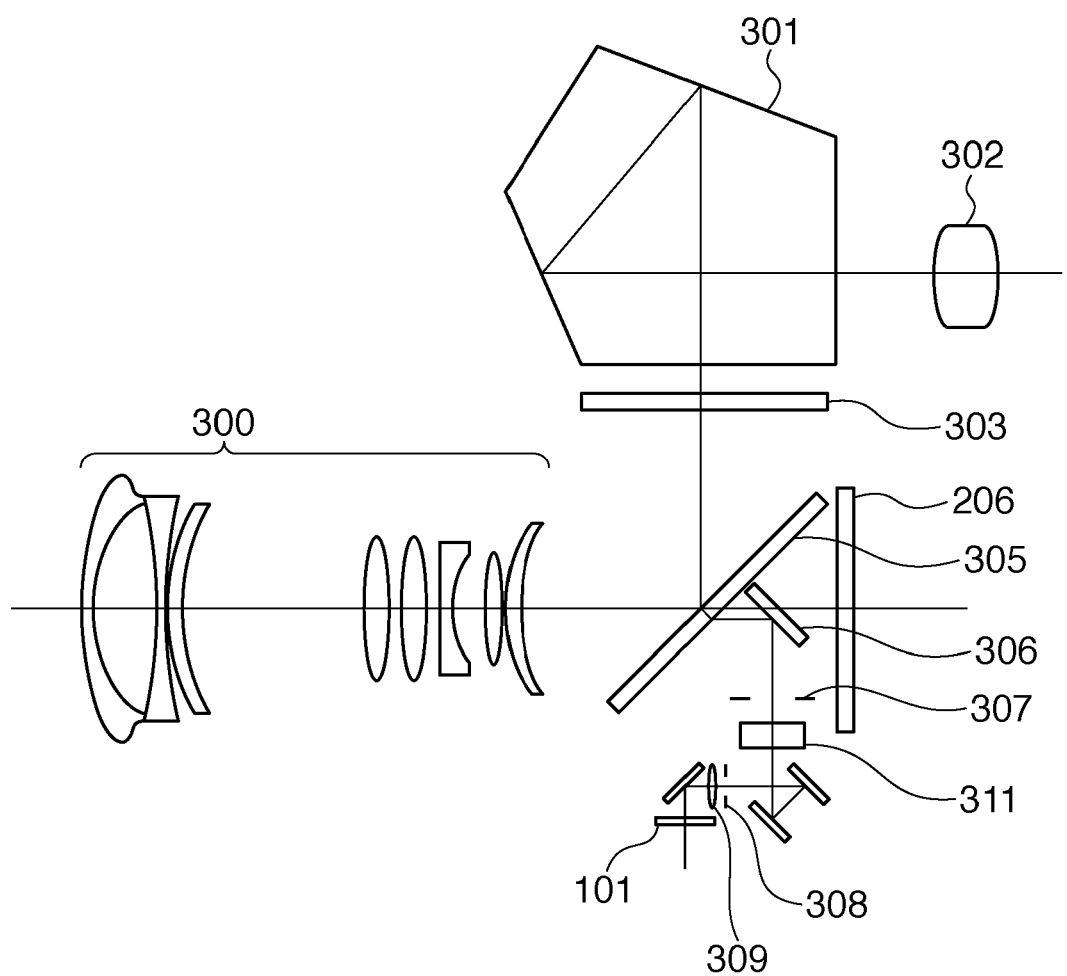
FIG. 2 is a view showing the arrangement of the optical system of the camera according to the first embodiment.

The AF sensor 101 includes line sensors. The CPU 100 controls the AF sensor 101 to detect the defocus amount based on an object contrast distribution obtained by the line sensors and control the focus position of the imaging lens 300 (FIG. 2).

The CPU 100 controls the AE sensor 207 to detect the object brightness and determine the stop value and shutter speed of the imaging lens (not shown). An imaging operation is performed by controlling the stop value via the lens communication circuit 205, controlling the shutter speed by adjusting the energization time of the shutter magnets 218a and 218b via the shutter control circuit 208, and controlling the image sensor 206.

The CPU 100 incorporates a storage circuit 209 such as a ROM that stores programs to be used to control the camera operation, a RAM configured to store variables, and an EEPROM (Electrically Erasable and Programmable ROM) configured to store various kinds of parameters.

The optical arrangement of the camera will be described next with reference to FIG. 2. Most of a light beam input from the object via the imaging lens 300 is reflected upward by a quick return mirror 305 so as to form an object image on a finder screen 303. The user of the camera can observe the image via a pentaprism 301 and an eyepiece lens 302. Some components of the imaging light beam pass through the quick return mirror 305 and are bent downward by a sub-mirror 306 on the rear side so as to form an image on the AF sensor (focus detection sensor) 101 via a visual field mask 307, field lens 311, stop 308, and secondary imaging lens 309. When an image signal obtained by photo-electrically converting the image is processed, the focus state of the imaging lens 300 can be detected. In image capturing, the quick return mirror 305 flips up so that the entire light beam forms an image on the image sensor 206, and the object image is exposed.

The focus detection apparatus of this embodiment (formed from the AF sensor 101 and the optical system from the visual field mask 307 to the secondary imaging lens 309 in FIG. 2) uses a known phase difference detection method as the focus detection method. The apparatus can detect the focus states of a plurality of different areas in a screen.

Figure 3:
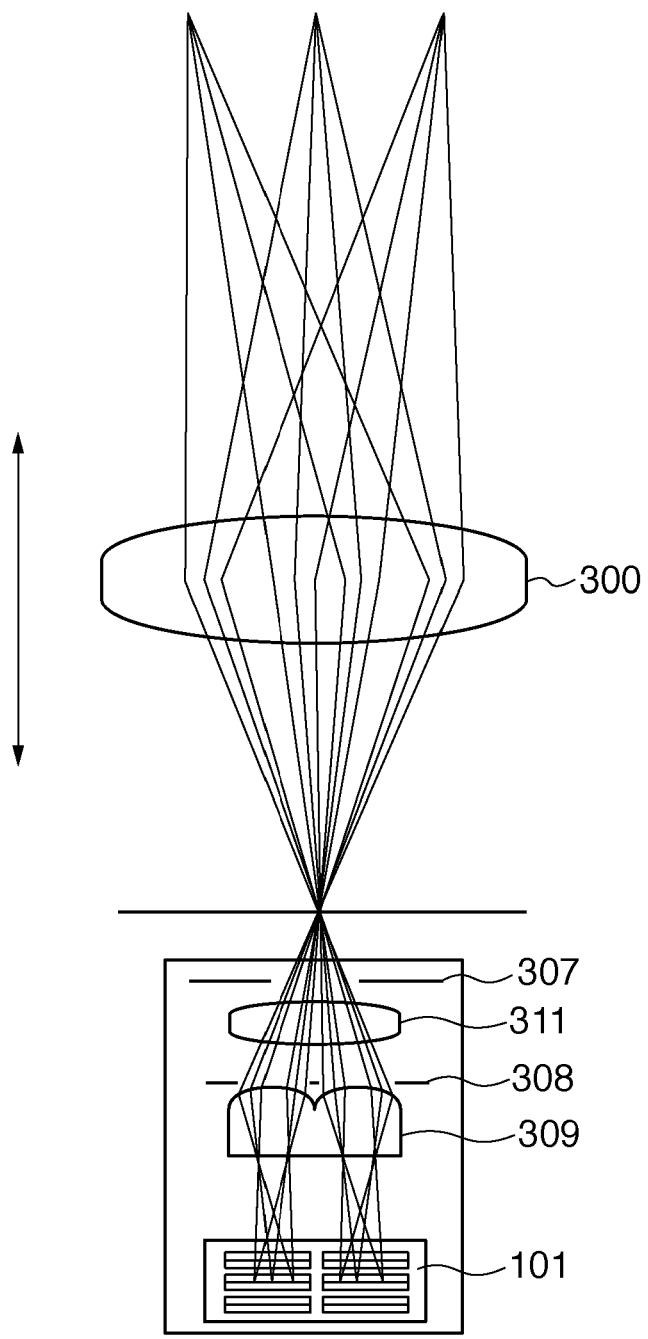
FIG. 3 is a view showing the optical arrangement of a focus detection apparatus according to the first embodiment.

FIG. 3 shows the detailed arrangement of the optical system concerning focus detection. A light beam from an object, which has passed through the imaging lens 300, is reflected by the sub-mirror 306 (FIG. 2) so as to temporarily form an image near the visual field mask 307 that is on a plane conjugate to the imaging plane. FIG. 3 illustrates a developed optical path that is reflected by the sub-mirror 306. The visual field mask 307 is a member that shields extra light in areas except the focus detection area (also referred to as a focus point hereinafter) in the screen.

The field lens 311 has a function of forming an image of each opening portion of the stop 308 near the exit pupil of the imaging lens 300. The secondary imaging lens 309 is arranged behind the stop 308. The secondary imaging lens 309 is formed from a pair of lenses. Each lens corresponds to one opening portion of the stop 308. The light beams having passed through the visual field mask 307, field lens 311, stop 308, and secondary imaging lens 309 form images on the line sensors of the AF sensor 101. The line sensors of the AF sensor 101 are also configured to form an image of a light beam from a different object in the imaging screen.

The relationship between the line sensors of the AF sensor 101 and the focus points in the imaging screen will be described with reference to FIGS. 4A to 4C.

Figure 4A:
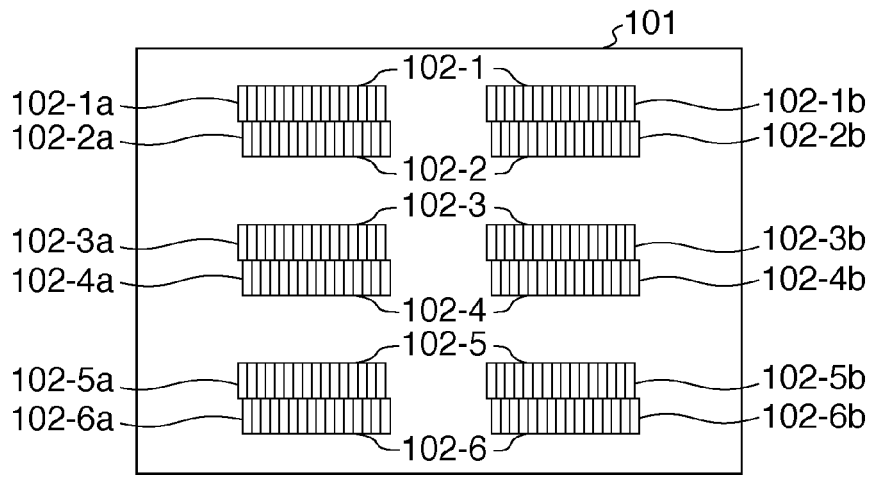
FIGS. 4A to 4C are views showing the arrangement of line sensors and focus points according to the first embodiment.

FIG. 4A is a view showing the arrangement of the line sensors of the AF sensor 101. Line sensors 102-1a and 102-2a are arranged in parallel to be adjacent to each other while being relatively shifted from each other (staggered). Line sensors 102-1b and 102-2b are also arranged in parallel to be adjacent to each other while being relatively shifted from each other (staggered). The secondary imaging lens 309 makes the line sensors 102-1a and 102-1b pair off and the line sensors 102-2a and 102-2b pair off so as to form line sensors 102-1 and 102-2. The pair of line sensors 102-1 and 102-2 receive light beams having passed through different pupil areas of the imaging lens 300. The phase difference between two images output from the pair of line sensors is detected so as to detect the defocus amount. Similarly, line sensors 102-3 and 102-4 and line sensors 102-5 and 102-6 are also staggered. That is, two pairs of line sensors are arranged while being shifted from each other in the longitudinal direction of the line sensors.

Figure 4B:
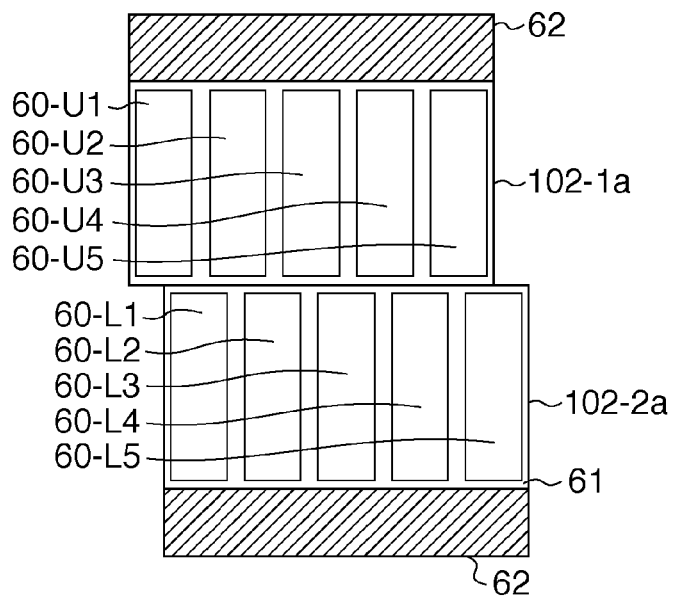

FIG. 4B illustrates an example of the arrangement of the line sensors 102-1a and 102-2a. For the descriptive convenience, each line sensor is formed from five pixels. The line sensor 102-1a includes photodiodes (light-receiving portions) 60-U1 to 60-U5, and the line sensor 102-2a includes photodiodes (light-receiving portions) 60-L1 to 60-L5. The photodiodes 60-U1 to 60-U5 and photodiodes 60-L1 to 60-L5 are arranged at the same pixel pitch. Note that each pixel includes not only the photodiode but also switch, capacitance, and amplification circuit, as will be described later. However, FIG. 4B illustrates only the photodiodes and an element isolation region 61 while omitting switch, capacitance, and amplification circuit. The switch, capacitance, and amplification circuit are formed in a light-shielding layer 62 so as to be adjacent to the photodiode formation region.

Figure 4C:
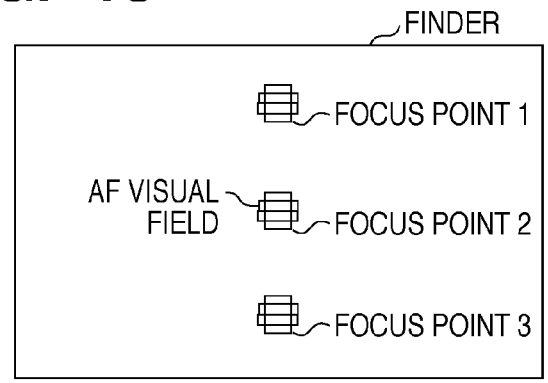

FIG. 4C is a view showing the arrangement of focus points displayed in the finder and AF visual fields formed by the line sensors of the AF sensor 101. The line sensors 102-1 and 102-2 are arranged at focus point 1, the line sensors 102-3 and 102-4 are arranged at focus point 2, and the line sensors 102-5 and 102-6 are arranged at focus point 3. A set of two line sensors that are close to each other are arranged at one focus point, and the pixel pitch is equivalently halved (by staggering the line sensors). This allows to improve the focus detection accuracy for a high-frequency object.

Figure 5:
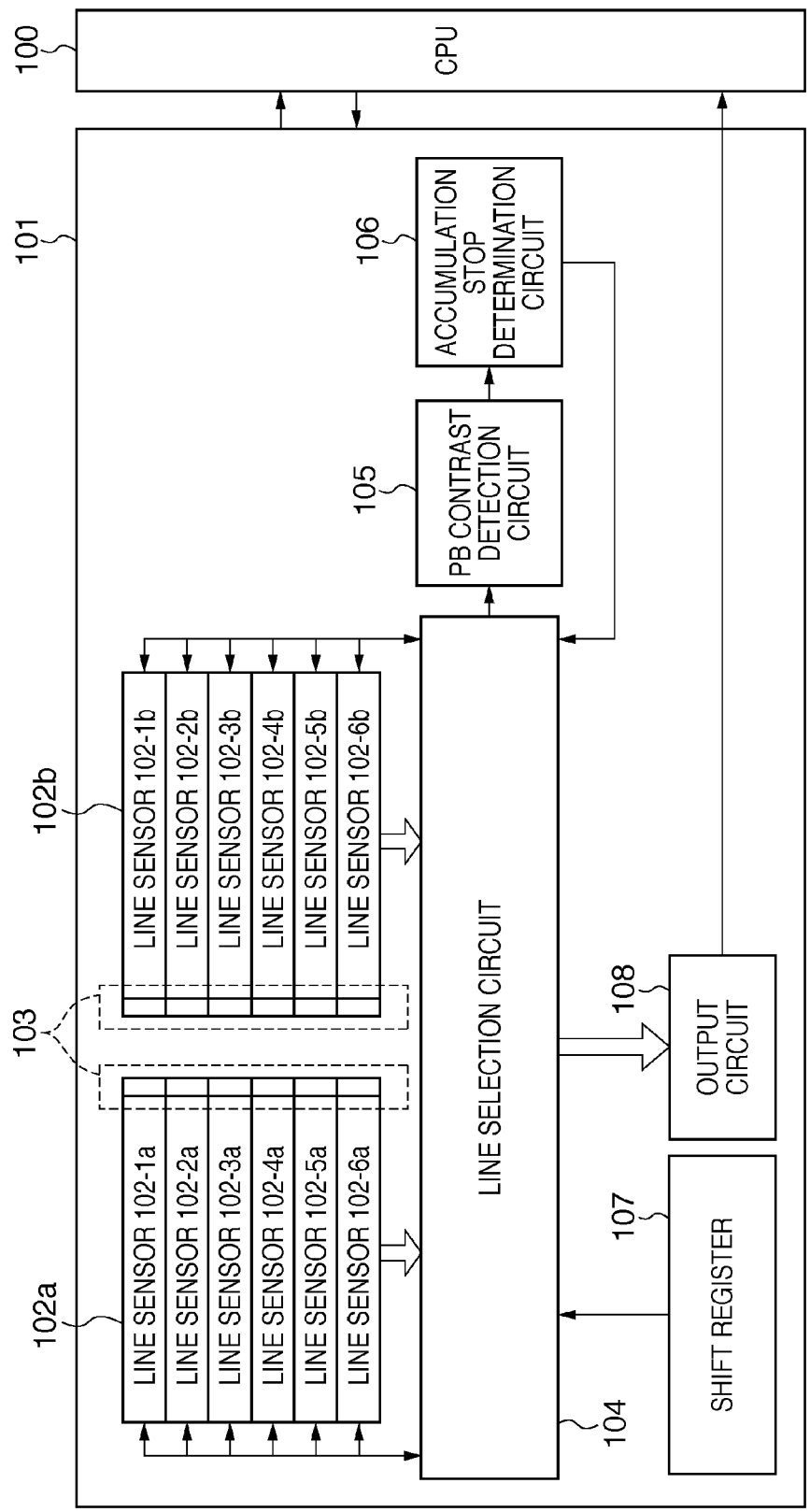
FIG. 5 is a block diagram showing the arrangement of an AF sensor according to the first embodiment.

The detailed circuit arrangement of the AF sensor 101 will be described with reference to the block diagram of FIG. 5. Object images formed by the secondary imaging lens 309 are photo-electrically converted by line sensors 102a and 102b and accumulated as charges. The amplification circuit outputs the accumulated charges as a voltage. The line sensors 102a and 102b have a sensitivity switching circuit 103 for each line. A line selection circuit 104 selects one of the plurality of lines of the line sensors 102a and 102b. The line selection circuit 104 has a function of transmitting the line sensor accumulation signal to a PB contrast detection circuit to be described later.

A PB contrast detection circuit 105 detects the largest signal (to be referred to as a Peak signal hereinafter) and a smallest (to be referred to as a Bottom signal hereinafter) signal out of the pixel signals of the line selected by the line selection circuit 104. The difference signal (to be referred to as a PB signal hereinafter) between the Peak signal and the Bottom signal is output to an accumulation stop determination circuit 106.

Figure 6:
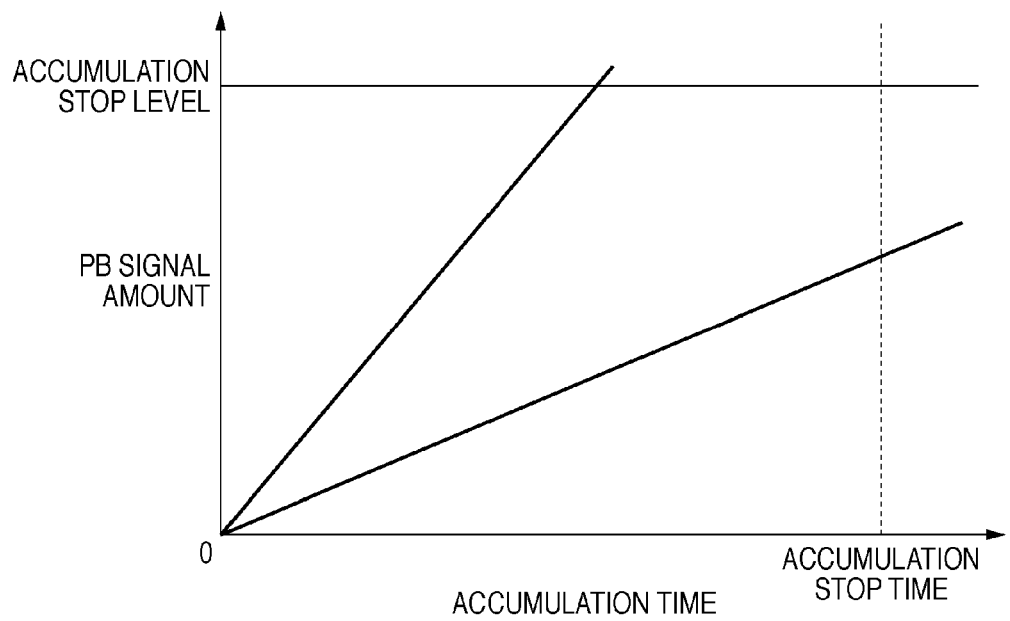
FIG. 6 is a graph for explaining a method of controlling a PB signal and an accumulation time according to the first embodiment.

FIG. 6 is a graph showing the relationship between the accumulation time and the signal amount of the PB signal output from the PB contrast detection circuit 105. Accumulation time "0" is the accumulation start timing. The amount of the PB signal increases as the time elapses. The accumulation stop determination circuit 106 compares the PB signal with the accumulation stop level. At the timing the PB signal has exceeded the accumulation stop level, the accumulation stop determination circuit 106 outputs an accumulation stop signal to the line sensors 102a and 102b to stop accumulation of the pixels of the line selected by the line selection circuit 104. The accumulation stop determination circuit 106 also outputs, to the CPU 100, an accumulation end signal and information of the line where the accumulation has ended. If the PB signal has not reached the target value within a predetermined time, the accumulation stop determination circuit 106 outputs the accumulation stop signal to the line sensors 102a and 102b to forcibly stop accumulation.

The CPU 100 drives a shift register 107 so as to output the pixel signal of each pixel accumulated in the line sensors 102a and 102b to an output circuit 108. The output circuit 108 extracts the contrast component from the pixel signal, performs processing of, for example, amplifying the signal, and outputs it to the A/D converter (not shown) of the CPU 100.

Figure 7A:
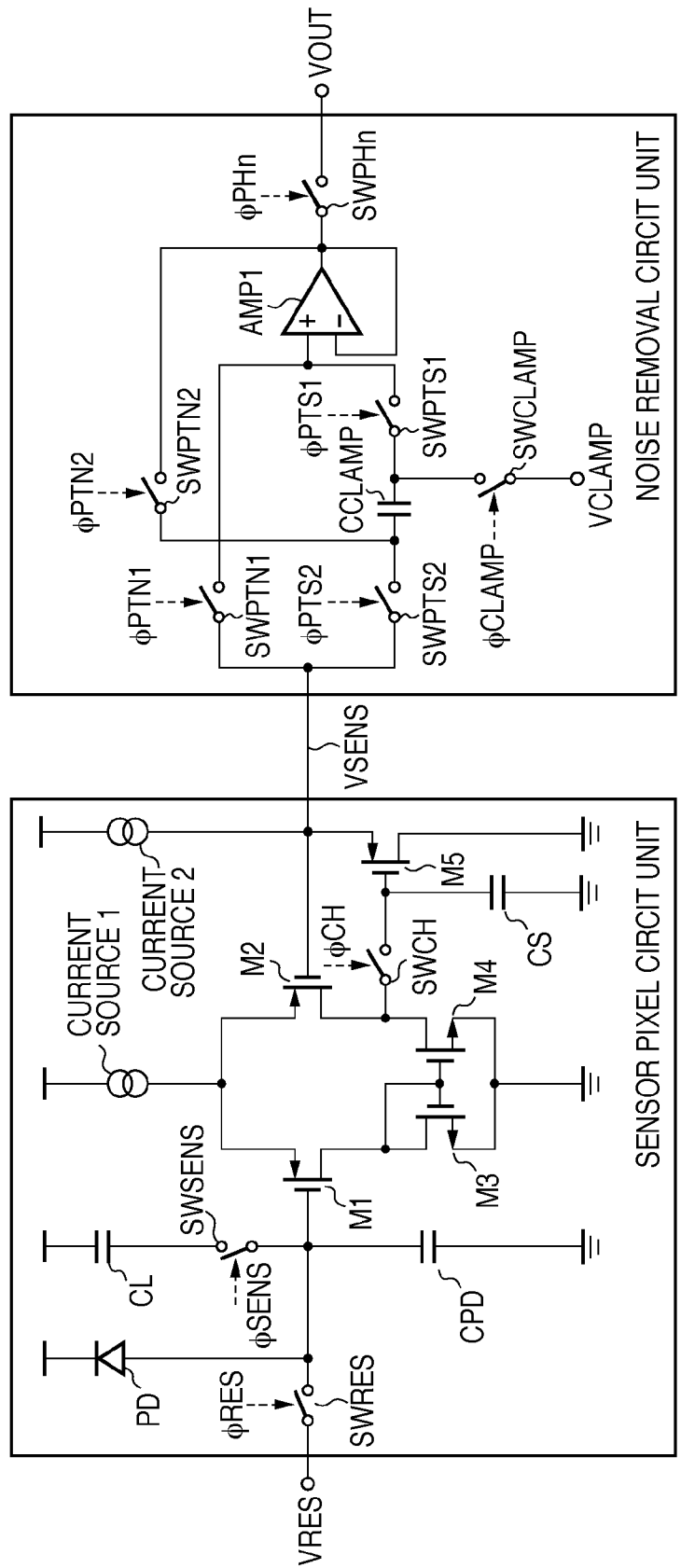

FIG. 7A is a circuit diagram showing the detailed arrangement of pixels of a line sensor. Referring to FIG. 7A, the line sensor includes a sensor pixel circuit unit and a noise removal circuit unit. The sensor pixel circuit unit includes a photodiode PD, capacitances CL, CPD, and CS, current source 1, current source 2, MOS transistors M1, M2, M3, M4, and M5, and switches SWRES, SWSENS, and SWCH. The noise removal circuit unit includes a capacitance CCLAMP, amplification circuit AMP1, and switches SWPTS1, SWPTS2, SWPTN1, SWPTN2, SWCLAMP, and SWPHn. A voltage VRES is a reset potential, and a voltage VCLAMP is a clamp potential. An output VOUT is connected to the line selection circuit 104. The capacitance CPD is a parasitic capacitance generated in the photodiode, MOS transistors, switches, and interconnections. The switches SWRES, SWSENS, SWCH, SWPTS1, SWPTS2, SWPTN1, SWPTN2, SWCLAMP, and SWPHn are on/off-controlled by signals φRES, φSENS, φCH, φPTS1, φPTS2, φPTN1, φPTN2, φCLAMP, and φPHn, respectively.

The operation of the circuit will be described with reference to the timing charts of FIG. 7B. First, the sensitivity is set by the signal φSENS. When the signal φSENS is at low level, the switch SWSENS is off. Only the capacitance CPD is connected to the transistor M1 to set the sensor at high sensitivity. When the signal φSENS is at high level, the switch SWSENS is on. The capacitances CPD and CL are connected to the transistor M1 to set the sensor at low sensitivity. An operation at low sensitivity will be described below.

The switches SWRES, SWCH, SWPTN1, SWPTN2, and SWCLAMP are turned on to reset the capacitances CL, CS, and CCLAMP. After that (after pixel reset), the switches SWRES, SWPTN2, and SWPTN1 are sequentially turned off. Let VOS1 be the offset voltage of the sensor pixel circuit unit, VOS2 be the offset voltage of the amplification circuit AMP1, and VN1 be the noise voltage generated upon turning off the switch SWSENS. The capacitance CCLAMP accumulates charges corresponding to

VCP=(VRES+VOS1+VOS2+VN1)−VCLAMP and stores noise. The switch SWPTS1 is turned on to connect the capacitance CCLAMP to the amplification circuit AMP1. After that, the switch SWCLAMP is turned off to end the noise storage operation.

Next, the switches SWPTS2 and SWPHn are turned on to start signal accumulation. Letting S be the accumulation signal, an output VSENS of the sensor pixel circuit unit is given by

VSENS=VRES+VOS1+VN1+S

An input VIN of the amplification circuit AMP1 is represented by subtracting the above-described noise voltage stored in the capacitance CCLAMP and given by

VIN=VSENS−VCP=S−VOS2+VCLAMP

Hence, the sensor output VOUT is given by

VOUT=VIN+VOS2=S+VCLAMP

In the above-described way, the noise removal circuit unit removes noise from the accumulation signal upon outputting the signal, thereby accurately detecting the PB contrast.

When ending the accumulation, the switch SWCH is turned off to hold the charges in the capacitance CS.

When reading out the signal, the line selection circuit 104 selects a line sensor to be read-accessed. in accordance with the signal from the shift register 107, the switches SWPHn are sequentially turned on to output the signal to the output circuit. At this time, an accumulation signal from which noise is removed by the noise removal circuit unit is obtained, as in signal accumulation.

Figure 7C:
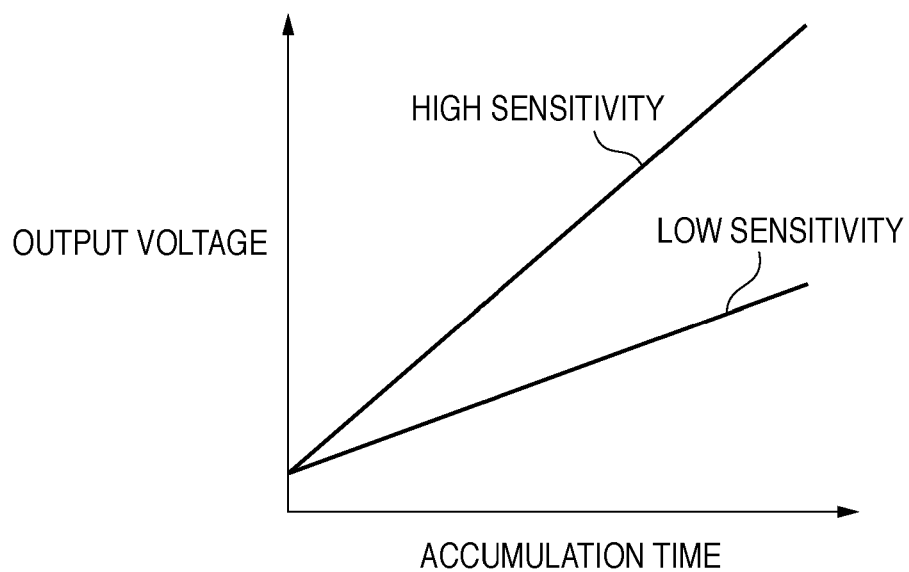

FIG. 7C is a graph showing the relationship between the accumulation time and the output voltage when the brightness is constant. Accumulation time "0" is the accumulation start timing. The output voltage increases as the time elapses. The slope of the output voltage of a line sensor set at high sensitivity becomes greater than that of the output voltage of a line sensor set at low sensitivity.

Figure 8:
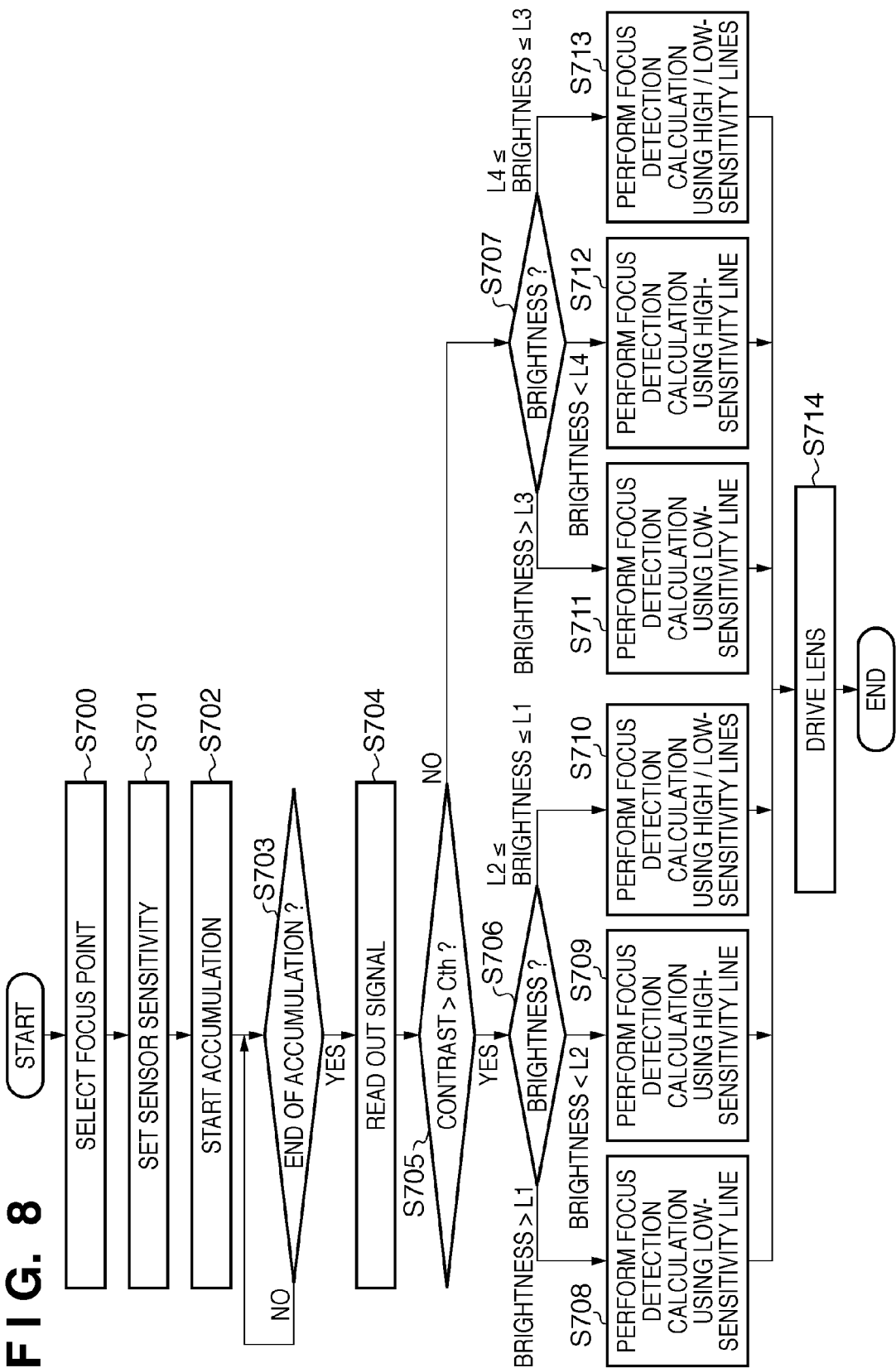
FIG. 8 is a flowchart of a focus detection operation according to the first embodiment.

The operation of the focus detection apparatus having the above-described arrangement will be described in detail based on the flowchart of FIG. 8. Upon receiving a focus detection start signal by operating the switch group 214, the CPU 100 controls the AF sensor 101 to start the focus detection operation. In step S700, a focus point for focus detection is selected by operating the switch group 214. For example, focus point 1 shown in FIG. 4C is selected.

In step S701, the CPU 100 controls the AF sensor 101 so as to cause the sensitivity switching circuit 103 to set the sensitivity of the line sensor. In this example, the line sensor 102-1 is set at high sensitivity, and the line sensor 102-2 is set at low sensitivity.

In step S702, the CPU 100 controls the AF sensor 101 to start the signal accumulation operation by the line sensors 102-1 and 102-2. In step S703, the accumulation stop determination operation is performed. The CPU 100 detects the accumulation stop signal output from the AF sensor 101. The operation in step S703 is repeated until the accumulation stop signal is detected. Upon detecting the accumulation stop signal, the process advances to a signal readout operation in step S704. In step S704, a pixel signal is read out.

Figure 9A:
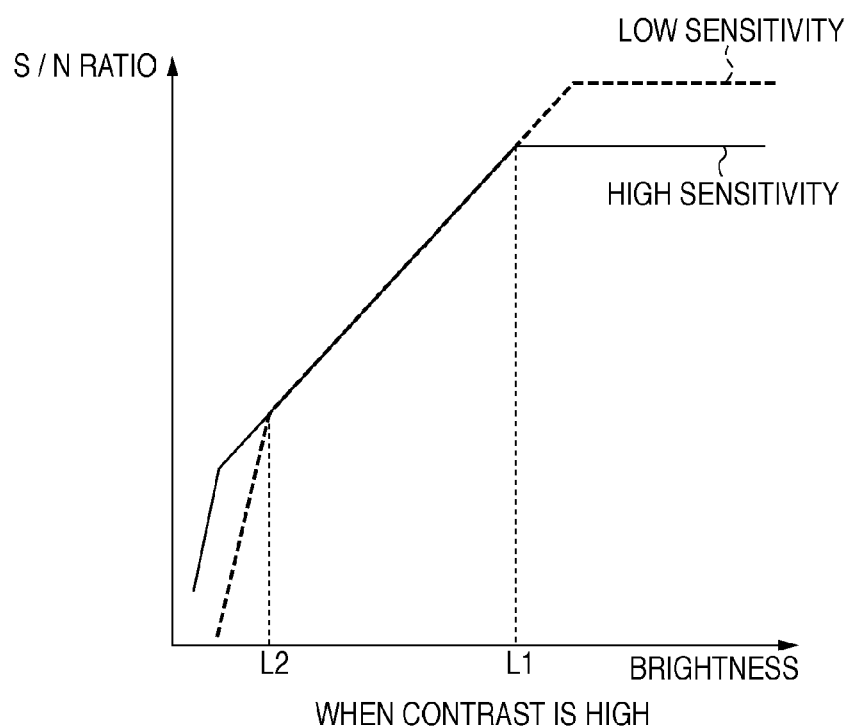
FIGS. 9A and 9B are graphs showing the relationship between the object brightness and the S/N ratio.
Figure 9B:
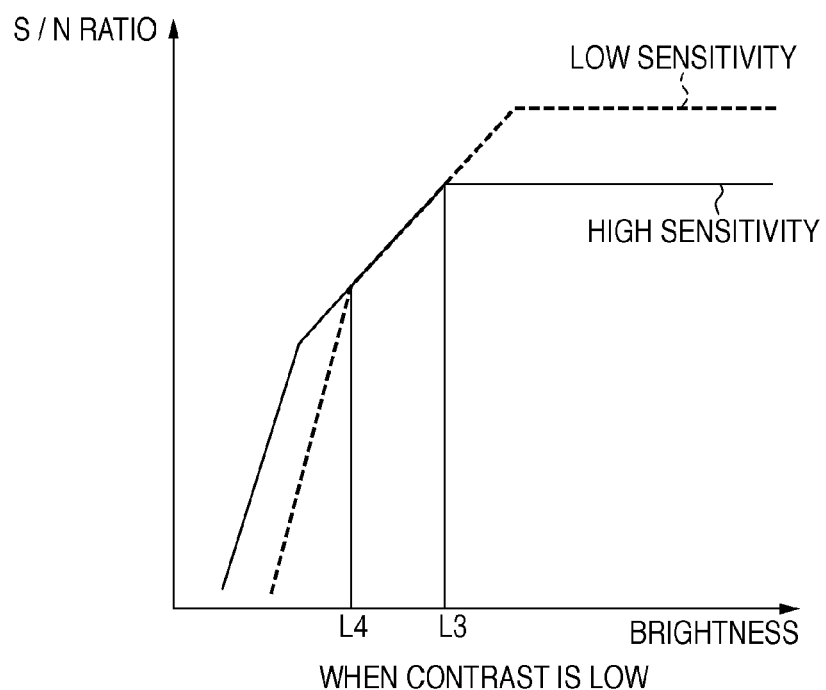

In the reliability determination process of steps S705, S706, and S707, the reliability of the pixel signal is determined in accordance with the contrast and brightness information of the object. The line sensor is switched based on the determination result. The pixel signal reliability determination will be explained. FIGS. 9A and 9B show the relationship between the object brightness and the S/N ratio of the AF sensor output.

FIG. 9A is a graph when the object contrast is higher than a predetermined value Cth. When the object brightness is high, accumulation is controlled so as to make the PB signal constant. Hence, the S/N ratio has a predetermined value. In this brightness range, optical shot noise is dominant. The line sensor set at low sensitivity has a wider dynamic range in the pixel unit than in the line sensor set at high sensitivity. For this reason, the brightness at which the S/N ratio is constant is high, and the influence of optical shot noise is small. Hence, the S/N ratio is higher at high brightness than in the line sensor set at high sensitivity. Let L1 be the brightness at which the S/N ratio of the low-sensitivity line sensor>the S/N ratio of the high-sensitivity line sensor.

When the brightness of the object is low, the PB signal amount of the line sensor does not reach the accumulation stop level within the predetermined accumulation time, and the accumulation is forcibly stopped. At a brightness lower than that for forcible accumulation stop, the S/N ratio of the AF sensor output abruptly degrades. This is because though the noise generated by a dark current or in the circuit does not change, the signal amount decreases. In the line sensor set at high sensitivity, the brightness at which accumulation is forcibly stopped is low, and the S/N ratio at a low brightness is higher than in the line sensor set at low sensitivity. Let L2 be the brightness at which the S/N ratio of the high-sensitivity line sensor>the S/N ratio of the low-sensitivity line sensor.

When the brightness of the object falls between L1 and L2, the line sensor set at low sensitivity and the line sensor set at high sensitivity have almost the same S/N ratio which improves as the brightness rises.

FIG. 9B is a graph when the object contrast is equal to or lower than the predetermined value Cth. When the object brightness is low, the amplitude is small because the signal from the line sensor is the contrast component of the object. For this reason, the S/N ratio degrades as a whole because it is readily strongly affected by optical shot noise at a high brightness or noise generated by a dark current or in the circuit at a low brightness. Let L3 be the brightness at which the S/N ratio of the low-sensitivity line sensor>the S/N ratio of the high-sensitivity line sensor at a high brightness. In this case, L1>L3. On the other hand, let L4 be the brightness at which the S/N ratio of the high-sensitivity line sensor>the S/N ratio of the low-sensitivity line sensor at a low brightness. In this case, L2<L4.

FIG. 10 shows the relationship between the object contrast and brightness, the line sensor sensitivity, and the focus detection calculation accuracy. When the object contrast is low, the influence of various kinds of noise is large, and the brightness range in which reliable focus detection calculation can be done at each sensitivity setting becomes narrow.

In step S705, the CPU 100 determines based on the readout signal whether the object contrast is greater than the predetermined threshold. The threshold is Cth. If the object contrast is greater than Cth, the object brightness is determined in step S706. The object brightness is calculated based on the readout signal and the accumulation time. Alternatively, the measurement result of the AE sensor 207 may be used. If the brightness is higher than L1 in step S706, the process advances to step S708 to perform focus detection calculation using the signal of the line sensor 102-2 set at low sensitivity. If the brightness is lower than L2, the process advances to step S709 to perform focus detection calculation using the signal of the line sensor 102-1 set at high sensitivity. If the brightness falls within the range of L2 to L1 (both inclusive), the process advances to step S710 to perform focus detection calculation using the sum of the signals of the line sensors 102-1 and 102-2.

Upon determining in step S705 that the object contrast is equal to or less than Cth, the object brightness is determined in step S707. If the brightness is higher than L3 in step S707, the process advances to step S711 to perform focus detection calculation using the signal of the line sensor 102-2 set at low sensitivity. If the brightness is lower than L4, the process advances to step S712 to perform focus detection calculation using the signal of the line sensor 102-1 set at high sensitivity. If the brightness falls within the range of L4 to L3 (both inclusive), the process advances to step S713 to perform focus detection calculation using the sum of the signals of the line sensors 102-1 and 102-2.

In step S714, The CPU 100 drives and controls the focus lens of the imaging lens 300 via the lens communication circuit 205 based on the defocus amount calculated in steps S708 to S713, thus ending the series of focus detection operations.

In this embodiment, one threshold is used to determine the object contrast. However, a plurality of thresholds may be used. In this case, subsequent brightness determination is performed for each threshold. The brightness may be calculated from the accumulation time. Alternatively, the threshold to be used to determine the object contrast may variably be determined by an operational expression. Reliability determination may be done based on the image coincidence level (signal coincidence level) between the output signals of the sensors of the pair of line sensors. FIG. 11A shows reliable waveforms which exhibit a high image coincidence level of the pair of line sensors. FIG. 11B shows unreliable waveforms which exhibit a low image coincidence level of the pair of line sensors because of the influence of noise or the like.

As described above, according to this embodiment, focus detection is performed by setting two sets of staggered line sensors at different sensitivities. This makes it possible to detect the focus of an object in a wider brightness range using line sensors set at appropriate sensitivity in one focus detection operation. In addition, within the brightness range where both the two sets of line sensors output reliable signals, the signals are added to perform more accurate focus detection.

Second Embodiment

Figure 12:
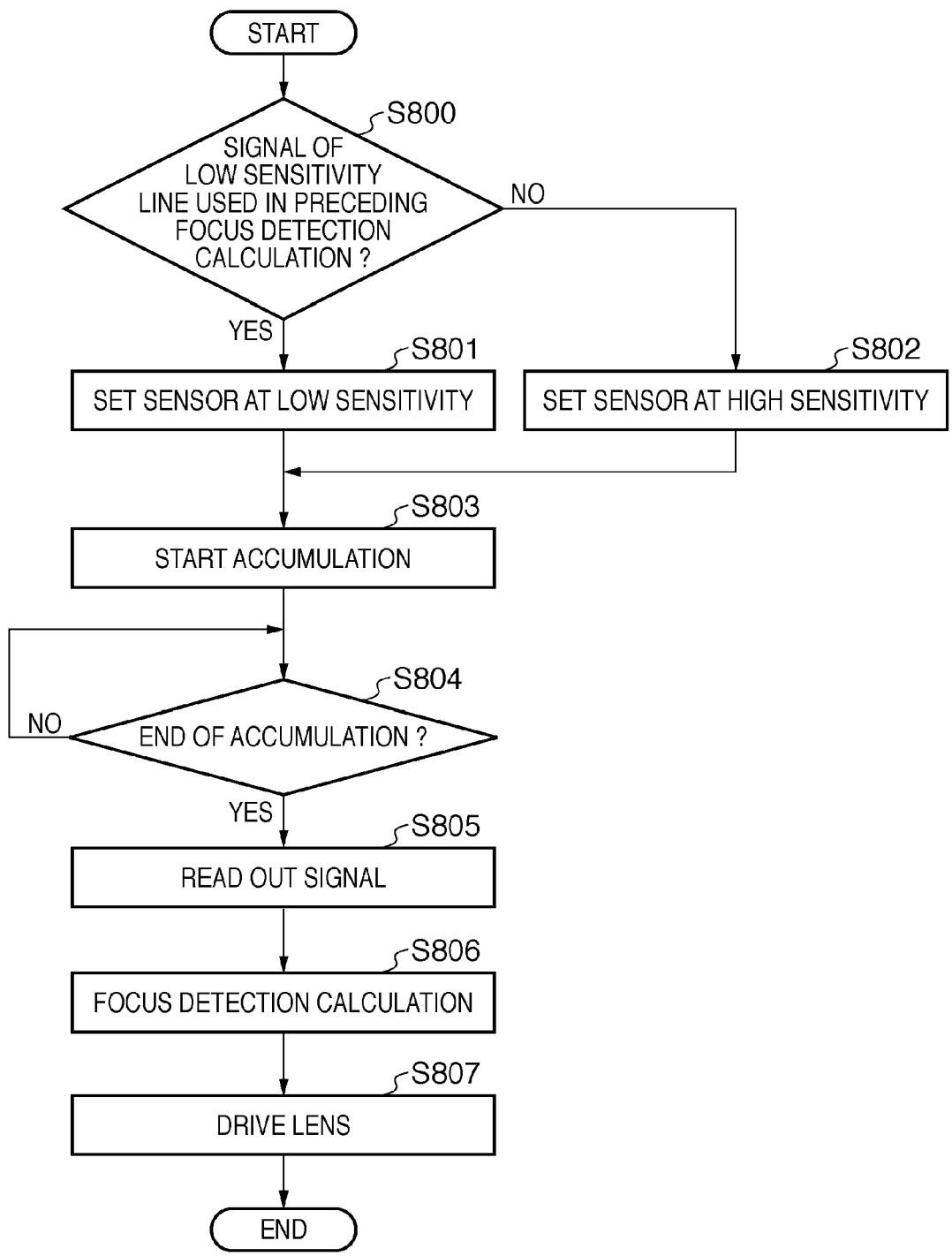
FIG. 12 is a flowchart of a focus detection operation according to the second embodiment.
Figure 13:
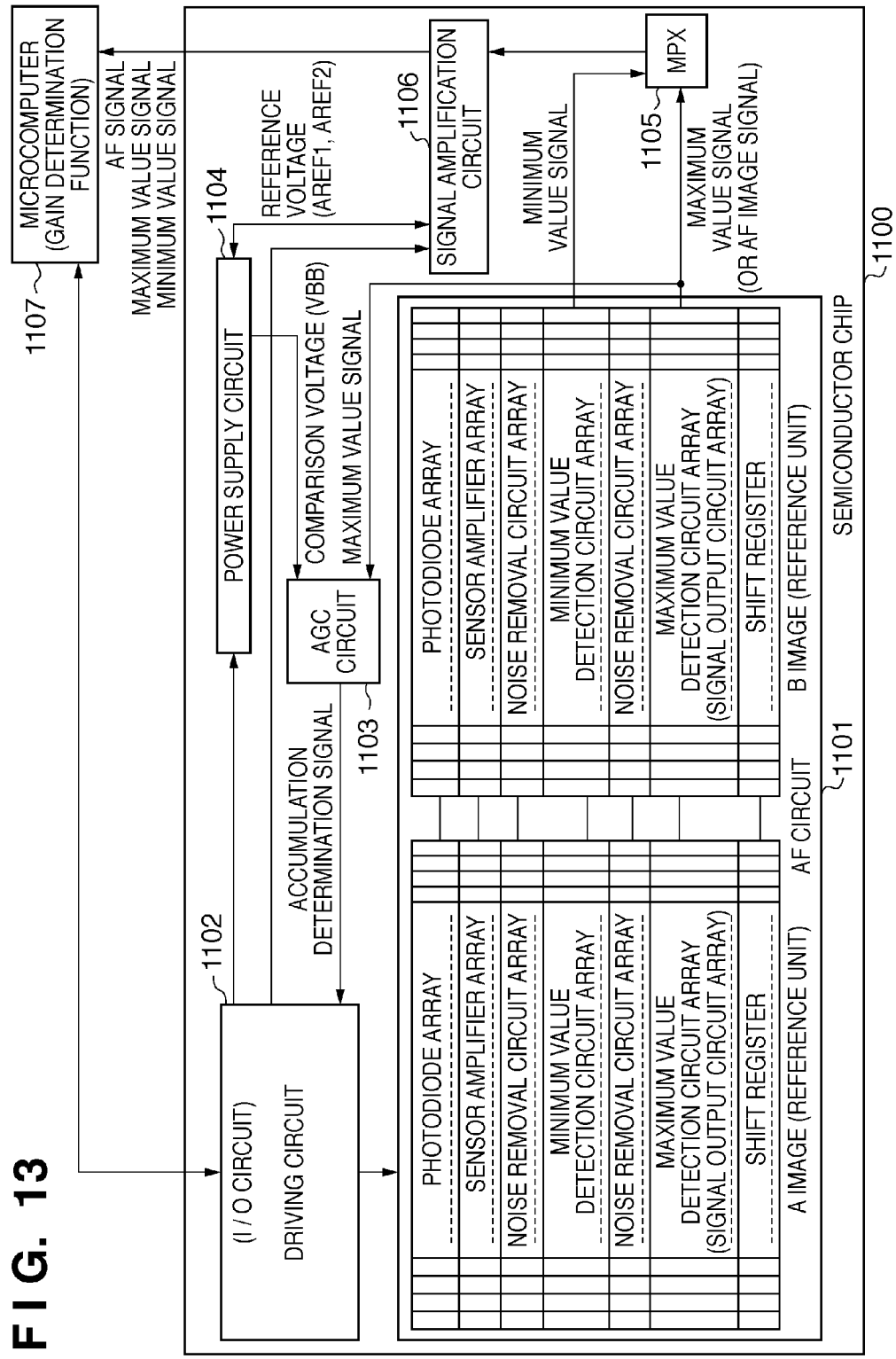
FIG. 13 is a block diagram of a conventional auto focus solid-state image capturing apparatus.

The operation of a focus detection apparatus according to the second embodiment of the present invention will be described below with reference to FIG. 12. FIG. 12 is a flowchart of second and subsequent focus detection operations when performing the focus detection operation continually a plurality of number of times in, for example, a continuously shooting mode. The first focus detection operation is the same as that of the first embodiment shown in FIG. 8.

In the first focus detection operation, focus point 1 is selected, a line sensor 102-1 is set at high sensitivity, and a line sensor 102-2 is set at low sensitivity.

The second focus detection operation will be described next. In step S800, it is determined whether focus detection calculation using the signal of the line sensor set at low sensitivity has been performed in the preceding focus detection operation. If focus detection calculation using only the signal of the line sensor 102-2 set at low sensitivity has been performed in the preceding focus detection operation, the process advances to step S801 to set both the line sensors 102-1 and 102-2 at low sensitivity. If focus detection calculation has been performed in the preceding focus detection operation using the sum of the signal of the line sensor 102-1 set at high sensitivity and the signal of the line sensor 102-2 set at low sensitivity, the process similarly advances to step S801 to set both the line sensors 102-1 and 102-2 at low sensitivity. Setting the line sensors at low sensitivity enables to accumulate more charges while suppressing the influence of optical shot noise. If focus detection calculation using only the signal of the line sensor 102-1 set at high sensitivity has been performed in the preceding focus detection operation, the process advances to step S802 to set both the line sensors 102-1 and 102-2 at high sensitivity.

In step S803, a CPU 100 controls an AF sensor 101 to start a signal accumulation operation by the line sensors 102-1 and 102-2. In step S804, an accumulation stop determination operation is performed. The CPU 100 detects an accumulation stop signal output from the AF sensor 101. The operation in step S804 is repeated until the accumulation stop signal is detected. Upon detecting the accumulation stop signal, the process advances to a signal readout operation in step S805.

In step S805, a pixel signal is read out. In step S806, focus detection calculation is performed using the sum of the signals of the line sensors 102-1 and 102-2. In step S807, The CPU 100 drives and controls the focus lens of an imaging lens 300 via a lens communication circuit 205 based on the defocus amount calculated in step S806, thus ending the series of focus detection operations. The third and subsequent focus detection operations are performed in accordance with FIG. 12, like the second focus detection operation. Note that, also in the continuously shooting mode, like the first embodiment, the focus detection apparatus perform the reliability judgment of the signal and change the line sensor to use for operation.

As described above, according to this embodiment, focus detection is performed in the first focus detection operation by setting two sets of staggered line sensors at different sensitivities. From the second time, focus detection is performed by setting both the two sets of line sensors at an appropriate sensitivity for the object and adding the signals. This allows to more accurately detect the focus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-007446, filed Jan. 15, 2010 and 2010-281015, filed Dec. 16, 2010, which are hereby incorporated by reference herein in their entirety.

What is claimed is:

1. A focus detection apparatus comprising:
a focus detection sensor formed by arranging a plurality of pairs of line sensors;
a sensitivity setting unit configured to set a sensitivity with respect to each pair of said plurality of pairs of line sensors;
and
a calculation unit configured to perform focus detection calculation using the signals of the line sensors;
wherein when continuously performing a plurality of focus detection operations, said sensitivity setting unit sets said plurality of pairs of line sensors at first and second sensitivities in a first focus detection operation, and sets all of said plurality of pairs of line sensors at a third sensitivity in second and subsequent focus detection operations.

2. The apparatus according to claim 1, further comprising a selection unit configured to select line sensors of said pair of line sensors, whose signals are to be used for the focus detection calculation, wherein said selection unit determines reliability of the signals of the line sensors, and selects, based on a determination result, the line sensors of said pair of line sensors, whose signals are to be used for focus detection calculation.

3. The apparatus according to claim 1, further comprising a selection unit configured to select line sensors of said pair of line sensors, whose signals are to be used for the focus detection calculation, wherein said selection unit determines reliability of the signals of the line sensors based on at least one of pieces of information of brightness, contrast, a level of coincidence between the signals of the pairs of line sensors, and an accumulation time, and selects, based on a determination result, the line sensors of said pair of line sensors, whose signals are to be used for focus detection calculation.

4. The apparatus according to claim 1, wherein two pairs of line sensors adjacent to each other in said plurality of pairs of line sensors are shifted from each other in a longitudinal direction of said line sensors.

5. The apparatus according to claim 1, wherein said sensitivity setting unit switches the sensitivity of said line sensor by switching a capacitance to accumulate charges photo-electrically converted by said line sensor.

6. The apparatus according to claim 1, wherein said line sensor performs pixel reset after the sensitivity is set by said sensitivity setting unit.

7. The apparatus according to claim 1, wherein said line sensor comprises a noise removal unit configured to remove noise generated in said line sensor.

8. The apparatus according to claim 7, wherein said noise removal unit stores noise generated after pixel reset, and outputs a signal after removing the noise from the signal upon signal output.

9. The apparatus according to claim 1, wherein the third sensitivity is equal to the first sensitivity or the second sensitivity.

10. A focus detection apparatus comprising:
a focus detection sensor formed by arranging a plurality of pairs of line sensors;
a sensitivity setting unit configured to set a sensitivity with respect to each pair of said plurality of pairs of line sensors; and
a calculation unit configured to perform focus detection calculation using the signals of the line sensors,
wherein when continuously performing a plurality of focus detection operations, said sensitivity setting unit sets said plurality of pairs of line sensors at a third sensitivity which is determined based on signals of line sensors which are set to a first and a second sensitivity.

11. The apparatus according to claim 10, further comprising a selection unit configured to select line sensors of said pair of line sensors, who signals are to be used for the focus detection calculation, wherein said selection unit determines reliability of the signals of the line sensors, and selects, based on a determination result, the line sensors of said pair of line sensors, whose signals are to be used for focus detection calculation.

12. The apparatus according to claim 10, further comprising a selection unit configured to select line sensors of said pair of line sensors, whose signals are to be used for the focus detection calculation, wherein said selection unit determines reliability of the signals of the line sensors based on at least one of pieces of information of brightness, contrast, a level of coincidence between the signals of the pairs of line sensors, and an accumulation time, and selects, based on a determination result, the line sensors of said pair of line sensors, whose signals are to he used for focus detection calculation.

13. The apparatus according to claim 10, wherein two pairs of line sensors adjacent to each other in said plurality of pairs of line sensors are shifted from each other in a longitudinal direction of said line sensors.

14. The apparatus according to claim 10, wherein said sensitivity setting unit switches the sensitivity of said line sensor by switching a capacitance to accumulate charges photo-electrically converted by said line sensor.

15. The apparatus according to claim 10, wherein said line sensor performs pixel reset after the sensitivity is set by said sensitivity setting unit.

16. The apparatus according to claim 10, wherein said line sensor comprises a noise removal unit configured to remove noise generated in said line sensor.

17. The apparatus according to claim 16, wherein said noise removal unit stores noise generated after pixel reset, and outputs a signal after removing the noise from the signal upon signal output.

18. The apparatus according to claim 10, wherein the third sensitivity is equal to the first sensitivity or the second sensitivity.

* * * * *